US009495939B2

(12) United States Patent
Fukumoto

(10) Patent No.: US 9,495,939 B2
(45) Date of Patent: Nov. 15, 2016

(54) INFORMATION PROCESSING APPARATUS, METHOD AND COMPUTER PROGRAM PRODUCT, WITH USER-RELATED ACTION DETECTION

(75) Inventor: Yasutaka Fukumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 231 days.

(21) Appl. No.: 13/591,276

(22) Filed: Aug. 22, 2012

(65) Prior Publication Data

US 2013/0215009 A1 Aug. 22, 2013

(30) Foreign Application Priority Data

Oct. 11, 2011 (JP) ................................ 2011-223848

(51) Int. Cl.
| | | |
|---|---|---|
| *G09G 5/37* | (2006.01) | |
| *G01C 21/16* | (2006.01) | |
| *G06F 17/30* | (2006.01) | |
| *G01C 21/36* | (2006.01) | |

(52) U.S. Cl.
CPC ............. *G09G 5/37* (2013.01); *G01C 21/165* (2013.01); *G01C 21/367* (2013.01); *G06F 17/3087* (2013.01)

(58) Field of Classification Search
CPC .............................................. G09G 5/37–5/38
USPC ........................................................ 345/156
See application file for complete search history.

(56) References Cited

U.S. PATENT DOCUMENTS

| | | | | |
|---|---|---|---|---|
| 6,401,034 B1* | 6/2002 | Kaplan | ............. | G01C 21/3682 340/988 |
| 8,433,512 B1* | 4/2013 | Lopatenko | ............. | G01C 21/20 701/400 |
| 2002/0052674 A1* | 5/2002 | Chang et al. | ................ | 700/300 |
| 2002/0128768 A1* | 9/2002 | Nakano | ................. | G01C 21/32 701/533 |
| 2003/0160867 A1* | 8/2003 | Ohto et al. | ..................... | 348/135 |
| 2004/0193288 A1* | 9/2004 | Oka | ................................ | 700/1 |
| 2006/0089788 A1* | 4/2006 | Laverty | ............. | G01C 21/3679 701/426 |
| 2007/0083323 A1* | 4/2007 | Rosenberg | ..................... | 701/200 |
| 2008/0288166 A1* | 11/2008 | Onishi et al. | ................ | 701/209 |
| 2009/0019057 A1* | 1/2009 | Hayashi et al. | ................ | 707/10 |
| 2009/0048777 A1* | 2/2009 | Ebert et al. | .................... | 701/212 |
| 2009/0309900 A1* | 12/2009 | Ko et al. | ......................... | 345/666 |
| 2010/0241714 A1* | 9/2010 | Aono et al. | ................... | 709/206 |
| 2011/0078238 A1* | 3/2011 | Sakka | ............................ | 709/203 |

(Continued)

FOREIGN PATENT DOCUMENTS

JP 2009-150839 7/2009

*Primary Examiner* — William Boddie
*Assistant Examiner* — Andrew Schnirel
(74) *Attorney, Agent, or Firm* — Oblon, McClelland, Maier & Neustadt, L.L.P.

(57) ABSTRACT

An information processing apparatus, method and computer program product determine an object range to be displayed on a display based on a detected user-related action. For the apparatus, a control unit determines content to be displayed within an object range on a map. An action recognition processing unit that detects a user-related action. The control unit determines the content to be displayed within the object range. The object range includes a current position of the information processing apparatus, and a coverage area of the object range is based on the user-related action detected by the action recognition processing unit.

21 Claims, 15 Drawing Sheets

(56) References Cited

U.S. PATENT DOCUMENTS

2012/0323347 A1* 12/2012 Yariv ................ A63F 13/12
                                                700/92
2013/0304685 A1* 11/2013 Kurata et al. ............. 706/45

* cited by examiner

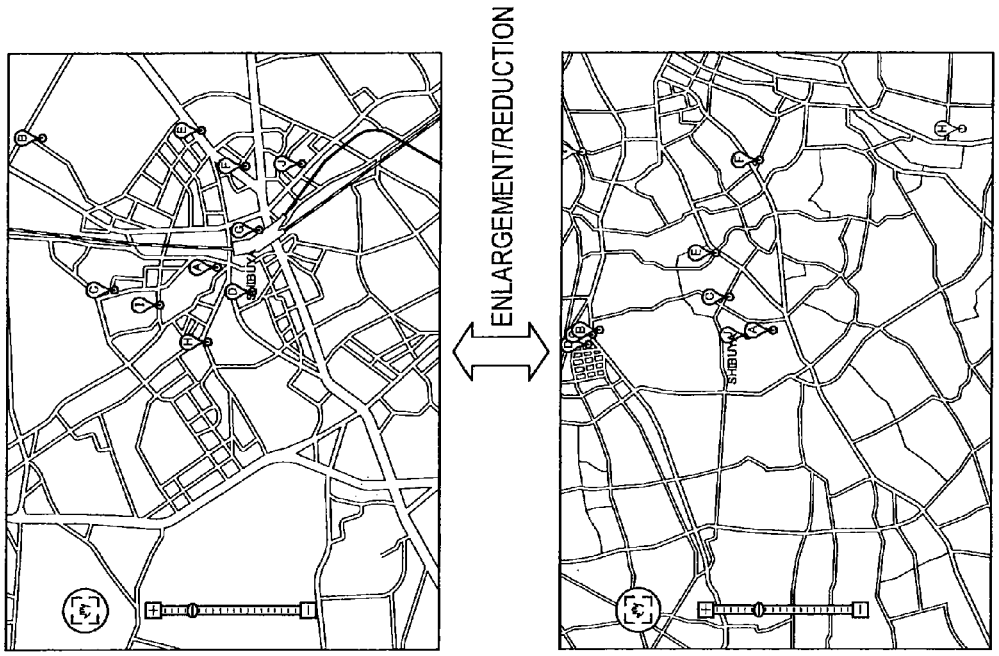
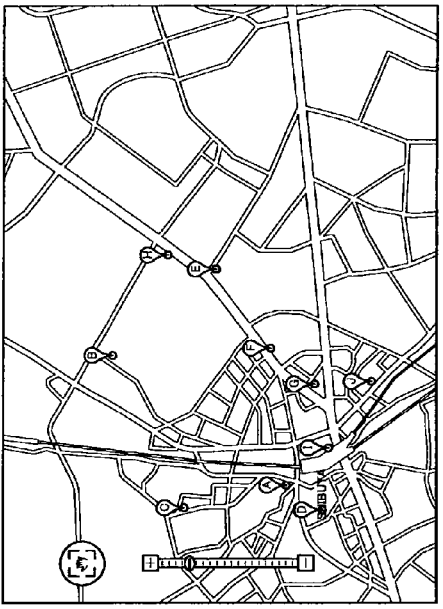
FIG. 3

FIG. 6
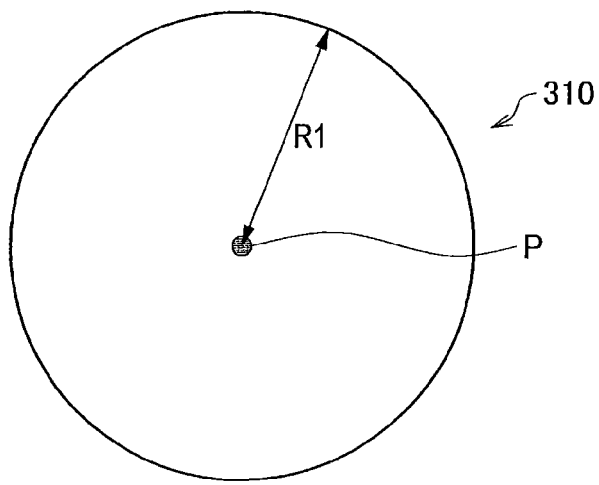
USER IS WALKING
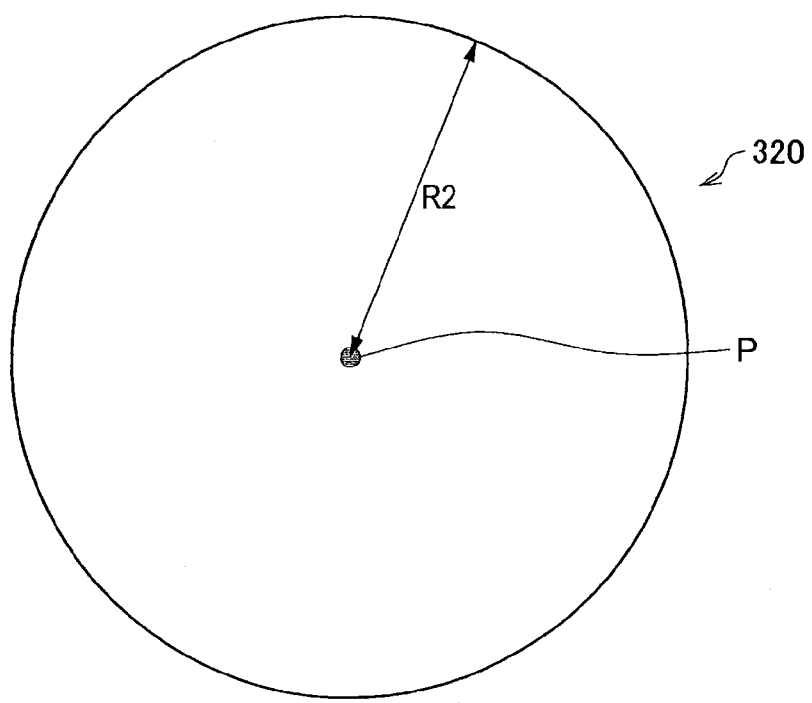
USER IS RUNNING

FIG. 7
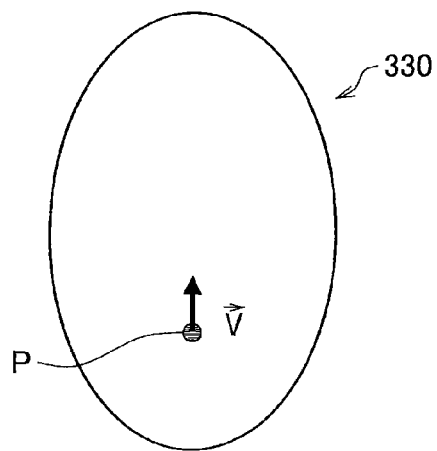
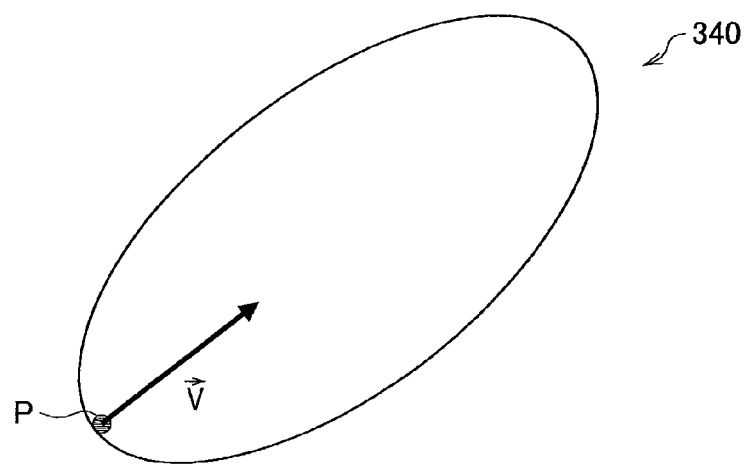

USER IS SEATED
(STOPPED)

USER IS STANDING
(STOPPED)

USER IS ON BUS

FIG. 15
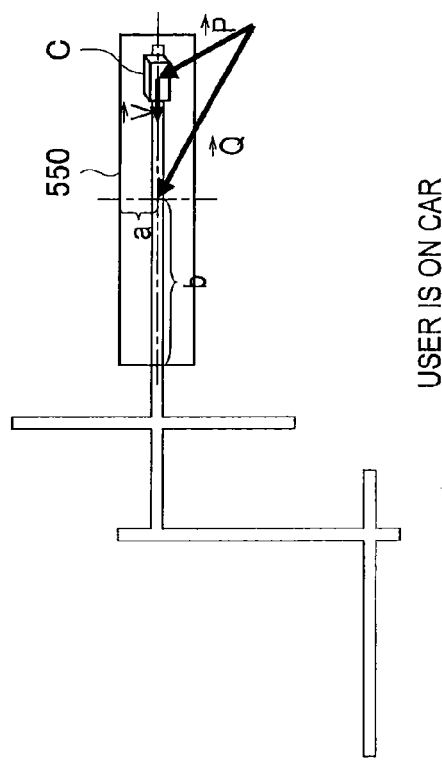
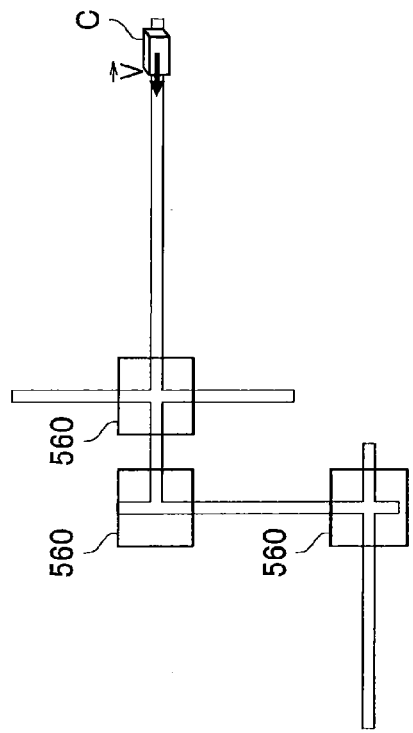
USER IS ON CAR

USER IS ON BICYCLE

INFORMATION PROCESSING APPARATUS, METHOD AND COMPUTER PROGRAM PRODUCT, WITH USER-RELATED ACTION DETECTION

BACKGROUND

The present disclosure relates to an information processing apparatus, an information processing method, and a computer program product.

In recent years, a multifunctional information processing apparatus such as a mobile phone has been developed. For this reason, a user can obtain a variety of information using various functions mounted to the information processing apparatus. For example, the user displays a map on a screen of the information processing apparatus and obtains specific information (for example, peripheral information of a position shown by a keyword) by searching the keyword.

Japanese Patent Application Publication No. 2009-150839 discloses a navigation apparatus that enables path display, map display, and other display adaptable to a change in the movement speed.

SUMMARY

However, in the related art, when specific information on a map is selected, is necessary for the user to perform an operation for setting a selection range. For this reason, a method of automatically setting a selection range in accordance with the intention of the user without performing the operation for setting the selection range by the user should be realized to improve convenience of the user.

It is desirable to provide a method of automatically setting a selection range for selecting a selection object on a map in accordance with the intention of a user.

In an information processing apparatus embodiment, the apparatus includes a control unit that determines content to be displayed within an object range on a map; and an action recognition processing unit that detects a user-related action, wherein said control unit determines the content to be displayed within the object range, said object range including a current position of the information processing apparatus and a coverage area of said object range being based on the user-related action detected by the action recognition processing unit. An information processing method and computer program product also may be used to determine an object range to be displayed on a display based on a detected user-related action.

BRIEF DESCRIPTION OF THE DRAWINGS

FIG. 3 is a diagram illustrating an aspect in which information provided to a screen is changed by changing a coordinate value or an enlargement/reduction ratio on a displayed map;

FIG. 6 is a schematic diagram illustrating a first embodiment of setting of an object range;

FIG. 7 is a schematic diagram illustrating a modification of the first embodiment;

FIG. 15 is a schematic diagram illustrating a fifth embodiment of setting of an object range;

DETAILED DESCRIPTION OF THE EMBODIMENT(S)

Figure 1:
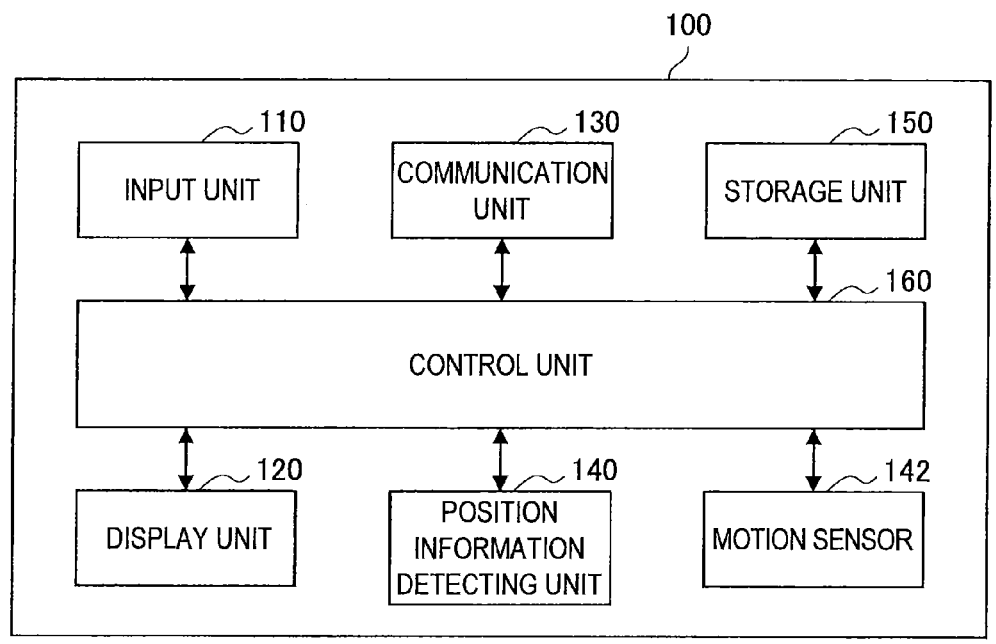
FIG. 1 is a diagram illustrating a configuration of an information processing apparatus according to the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Outline of Information Processing Apparatus
2. Display of Map Information
3. Functional Configuration of Information Processing Apparatus according to Present Disclosure
4. Example of Setting of Selection Range
5. Operation of Information Processing Apparatus
6. Conclusion

1. OUTLINE OF INFORMATION PROCESSING APPARATUS

An outline of an information processing apparatus 100 according to the present disclosure will be described with reference to FIG. 1. FIG. 1 is a diagram illustrating a configuration of the information processing apparatus 100 according to the present disclosure.

The information processing apparatus 100 is a portable terminal such as a mobile phone or a PDA that is used by a user. The information processing apparatus 100 has a function of displaying map information on a screen and selecting peripheral information.

As illustrated in FIG. 1, the information processing apparatus 100 includes an input unit 110, a display unit 120, a communication unit 130, a position information detecting unit 140, a motion sensor 142, a storage unit 150, and a control unit 160.

The input unit 110 has a function of receiving an input of operation information from a user of the information processing apparatus 100. The input unit 110 is configured using an input device such as a switch, a button, a touch panel, a keyboard, and a mouse.

The display unit 120 has a function of displaying a variety of information, on the basis of control from the control unit 160. For example, the display unit 120 displays map information. The display unit 120 is configured using a display device such as a liquid crystal display, a plasma display, and an organic EL display.

The communication unit 130 is a communication interface that has a function as a transmitting unit and a receiving unit performing communication with an external apparatus, on the basis of the control from the control unit 160. The communication unit 130 is configured using a communication device such as a wired or wireless LAN, a communication card for Bluetooth, a router for communication, and a modem for communication.

The position information detecting unit 140 that is a global positioning system (GPS) receiver performs wireless communication with the external apparatus and detects position information (information such as latitude and longitude) of the information processing apparatus 100. For example, the GPS receiver receives data showing orbit information and time information from a plurality of GPS satellites and detects a position of the information processing apparatus 100, on the basis of the information shown by the data or a lag of an arrival time of the data. The position information detecting unit 140 is not limited to the GPS receiver. For example, the position information detecting unit 140 may receive information from an access point of Wi-Fi or a radio frequency identification (RFID) system and detect the position of the information processing apparatus 100. The position information detecting unit 140 may receive data showing information regarding a cell where the information processing apparatus 100 is positioned, from a base station of a mobile phone network of the information processing apparatus 100 (mobile phone) and detect the position of the information processing apparatus 100.

The motion sensor 142 detects information regarding motion or a state of the information processing apparatus 100. For example, a triaxial acceleration sensor (including an acceleration sensor, a gravity detection sensor, and a fall detection sensor) or a triaxial gyro sensor (including an angular velocity sensor, a blurring correction sensor, and a geomagnetic sensor) is used as the motion sensor 142.

The storage unit 150 has a function of storing a variety of information used by the control unit 160. For example, the storage unit 150 stores position information that is acquired by the position information detecting unit 140 and motion information that is acquired by the motion sensor 142. The storage unit 150 is configured using a storage device such as a magnetic storage device, a semiconductor storage device, and an optical storage device.

The control unit 160 has a function of controlling an entire operation of the information processing apparatus 100. For example, the control unit 160 can control the operation of the information processing apparatus 100, on the basis of the operation information output from the input unit 110, the position information acquired by the position information detecting unit 140, and the motion information acquired by the motion sensor 142. The control unit 160 includes a CPU, a ROM, and a RAM.

2. DISPLAY OF MAP INFORMATION

As described above, the information processing apparatus 100 has the function of displaying the map information and selecting the peripheral information.

Before describing the display of the map information according to the present disclosure, display of map information according to examples will be described with reference to FIGS. 2 and 3.

Figure 2:
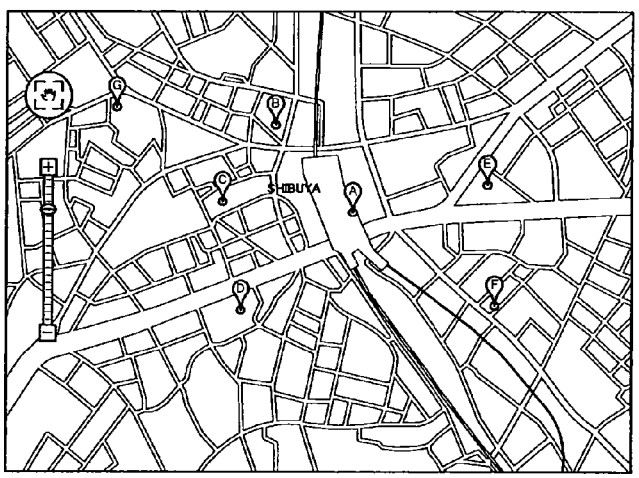
FIG. 2 is a diagram illustrating an aspect in which information provided to a screen is confined by searching a keyword on a displayed map.

FIG. 2 is a diagram illustrating an aspect in which information provided to a screen is confined by searching a keyword (for example, a keyword showing a specific store) on a displayed map. The confinement by the keyword search is performed by inputting the search keyword by the user. As illustrated in FIG. 2, according to the keyword search, information (an icon or a pin) showing a position of the specific store (in this case, Moon Bucks) is displayed on the map.

FIG. 3 is a diagram illustrating an aspect in which information provided to a screen is changed by changing a coordinate value or an enlargement/reduction ratio on the displayed map. The set coordinate value or enlargement/reduction ratio is changed according to an operation from the user. As illustrated in FIG. 3, the provided information (icon or pin) is changed according to the change in the coordinate value or the enlargement/reduction ratio.

As such, in the examples illustrated in FIGS. 2 and 3, when specific information on the map is selected, it is necessary for the user to perform various setting operations. For this reason, a method of automatically setting a selection range in accordance with the intention of the user, even though the user does not perform a setting operation, should be realized to improve convenience of the user.

In order to meet the request for realizing the method, the information processing apparatus 100 according to the present disclosure automatically sets a selection range for selecting a selection object (peripheral information) on the map, according to the motion information acquired by the motion sensor 142 and current position information acquired by the position information detecting unit 140.

Figure 4:
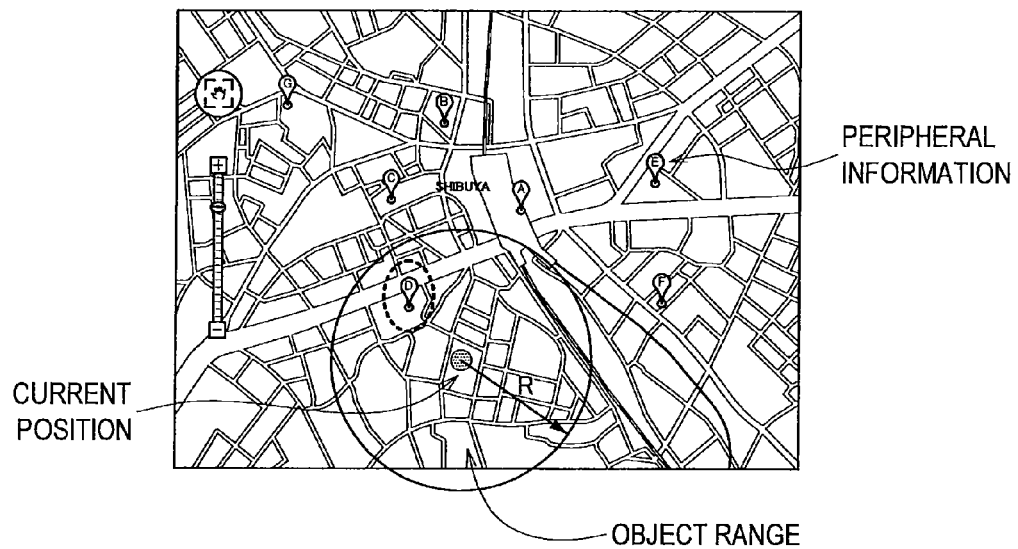
FIG. 4 is a diagram illustrating an outline of a method of setting a selection range according to the present disclosure.

FIG. 4 is a diagram illustrating an outline of a method of setting a selection range according to the present disclosure. The information processing apparatus 100 automatically sets a selection range (objection range in FIG. 4) on the map, according to the acquired motion information and the acquired current position information (position information). The information processing apparatus 100 automatically updates the selection range and switches display, when the user is moving. Thereby, even though the user does not perform the operation for setting the selection range, a useful selection range that corresponds to a context (information such as the position information and the motion information in which the intention of the user is reflected) in which the user is put is set.

3. FUNCTIONAL CONFIGURATION OF INFORMATION PROCESSING APPARATUS ACCORDING TO PRESENT DISCLOSURE

Figure 5:
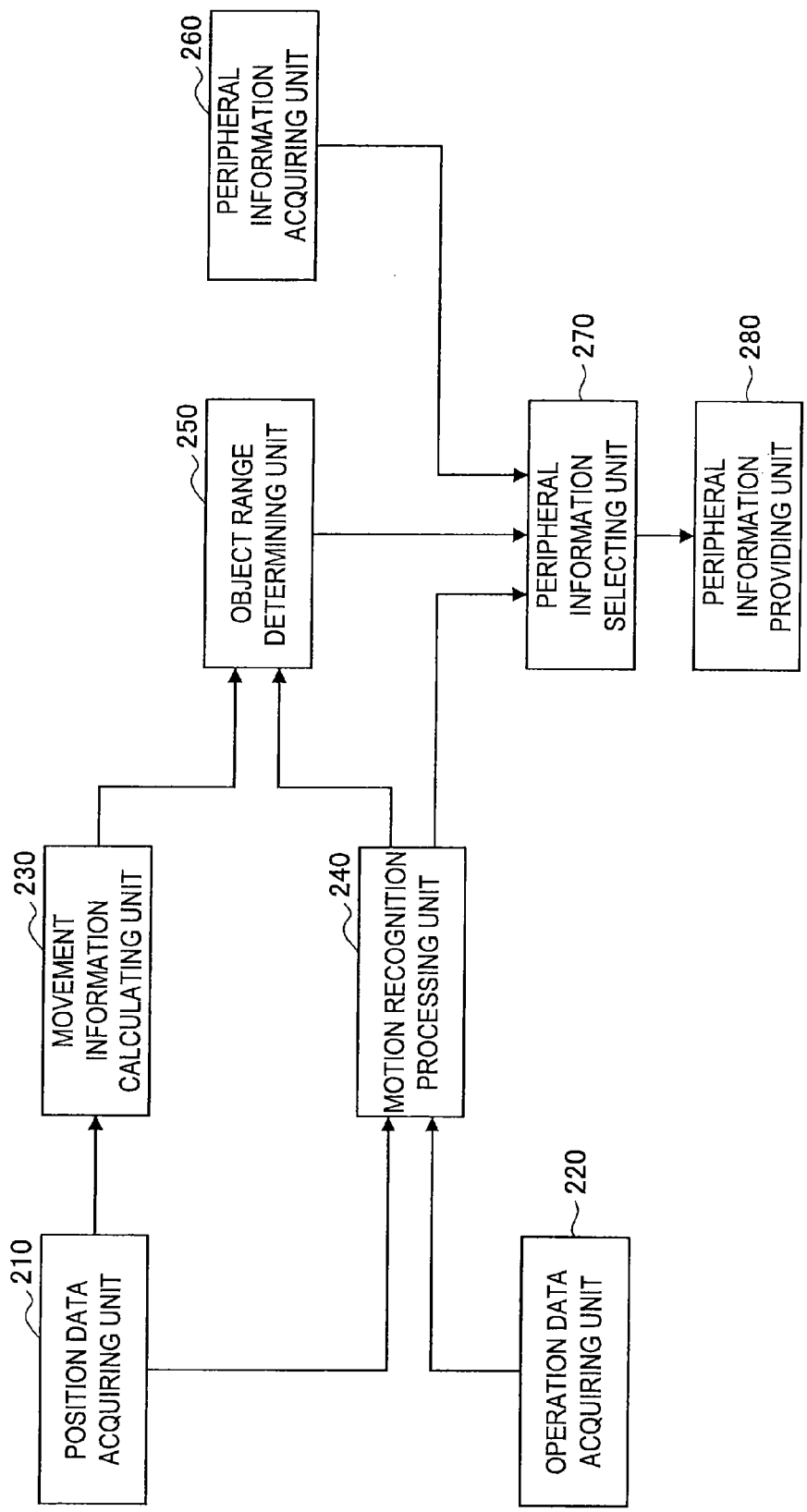
FIG. 5 is a block diagram illustrating a functional configuration of an information processing apparatus according to the present disclosure.

A functional configuration of the information processing apparatus 100 will be described with reference to FIG. 5. FIG. 5 is a block diagram illustrating the functional configuration of the information processing apparatus 100 according to the present disclosure.

As illustrated in FIG. 5, the information processing apparatus 100 includes a position data acquiring unit 210 to be an example of a position information acquiring unit, an operation data acquiring unit 220, a movement information acquiring unit 230 to be an example of a movement information acquiring unit, and a motion recognition processing unit 240 (also referred to as an action recognition processing unit) to be an example of a motion information acquiring unit. The information processing apparatus 100 further includes an object range determining unit 250 to be an example of a selection range setting unit, a peripheral information acquiring unit 260, a peripheral information selecting unit 270 to be an example of a selecting unit, and a peripheral information providing unit 280. These functional units are realized by the control unit 160 illustrated in FIG. 1.

The position data acquiring unit 210 acquires position data of the information processing apparatus 100 (user). The position data acquiring unit 210 acquires the position data of the information processing apparatus 100, on the basis of the position information detected by the position information detecting unit 140. For example, the position data acquiring unit 210 acquires current position information of the information processing apparatus 100 (user). The position data acquiring unit 210 outputs the acquired position data to the movement information calculating unit 230 and the motion recognition processing unit 240.

The operation data acquiring unit 220 acquires operation data regarding motion or a state of the information processing apparatus 100. The operation data acquiring unit 220 acquires the operation data regarding the motion or the state of the information processing apparatus 100, on the basis of the information detected by the motion sensor 142. The motion data acquiring unit 220 outputs the acquired operation data to the motion recognition processing unit 240.

The movement information calculating unit 230 calculates the movement information of the information processing apparatus 100 (user), on the basis of the position data input from the position data acquiring unit 210. Specifically, when the user who carries the information processing apparatus 100 moves, the movement information calculating unit 230 calculates a movement direction or a movement speed (that is, movement vector) of the user, on the basis of the position data. The movement information calculating unit 230 outputs the calculated movement information to an object range determining unit 250.

The motion recognition processing unit 240 recognizes the motion of the user who carries the information processing apparatus 100. The motion recognition processing unit 240 recognizes the motion of the user of the information processing apparatus 100, on the basis of the position data input from the position data acquiring unit 210 and the operation data input from the operation data acquiring unit 220, and acquires motion information of the user. The motion recognition processing unit 240 outputs the acquired motion information to the object range determining unit 250 or the peripheral information selecting unit 270.

The motion recognition processing unit 240 can identify a type of each motion, when the user takes a plurality of motions. For example, the motion recognition processing unit 240 identifies whether the user is walking, running, or is on a vehicle such as a train. The motion recognition processing unit 240 can calculate the duration of one motion as motion information of the user. For example, the motion recognition processing unit 240 calculates a time when the user is walking. When the user who carries the information processing apparatus 100 moves in an elevator in a structure having a plurality of floors, the motion recognition processing unit 240 can recognize that the elevator ascends or descends and acquire information regarding ascending or descending of the elevator.

The object range determining unit 250 sets an object range (corresponding to a selection range) to select a selection object on the map, according to the motion information acquired by the motion recognition processing unit 240 and the current position information acquired by the position data acquiring unit 210. In this case, the object range is automatically set on the basis of the motion information and the current position information of the user. For this reason, even though the user does not perform the operation for setting the object range, a useful object range that corresponds to a context (information such as the position information and the motion information in which the intention of the user is reflected) in which the user is put is set.

For example, when the object range determining unit 250 sets the object range, the object range determining unit 250 can change a shape showing an area of the object range. In this case, the object range determining unit 250 can select the area of the object range, according to the motion of the user.

The object range determining unit 250 can change the shape showing the area of the object range, according to the movement vector. Thereby, because the object range according to a movement direction or a movement speed of the user is set, an object range mismatched with a movement aspect of the user can be prevented from being set.

The object range determining unit 250 can set the object range such that the current position shown by the acquired current position information and the center of the object range become different positions. Thereby, even when the movement speed of the user is fast, an object range based on the spot of the movement destination can be set according to the movement speed.

The object range determining unit 250 can change the shape showing the area of the object range, according to the duration of the motion of the user. Thereby, an object range suitable for the motion can be set by changing the width of the object range according to the motion of the user.

For example, if the duration of the motion is lengthened, the object range determining unit 250 sets the area of the object range narrowly. Thereby, when the user does not move, information suitable for the state of the user can be provided by limiting (or excluding) the peripheral information little by little.

For example, if the duration of the motion is lengthened, the object range determining unit 250 sets the area of the object range widely. That is, the area of the object range is not widened until the duration of the motion is lengthened. Thereby, as compared with the case in which the object range is set widely by only slight movement of the user, peripheral information regarding remote regions can be prevented from being selected, even though the user moves.

When the elevator is ascending, the object range determining unit 250 can set floors higher than a floor where the elevator is positioned as the object range, and when the elevator is descending, the object range determining unit 250 can set floors lower than the floor where the elevator is positioned as the object range. In this case, because peripheral information of floors corresponding to a movement direction of the user in a structure is provided to the user, peripheral information of floors in a direction opposite to the movement direction of the user can be prevented from being provided.

The object range determining unit 250 can set the object range such that the current position shown by the acquired current position information is not included in the object range. Thereby, even when the movement speed of the user is fast, the object range based on the spot of the movement destination can be set according to the movement speed.

The object range determining unit 250 can set the object range such that the position of the motion destination of the user becomes the center of the object range. When the user gets on the vehicle and the movement speed is fast, the object range determining unit 250 can set the position of the movement destination as the center of the object range and set the object range to include peripheral information of the spot matched with the intention of the user.

For example, if the movement speed of the user increases, the object range determining unit 250 can set the area of the object range widely and if the movement speed of the user decreases, the object range determining unit 250 can set the area of the object range narrowly. Thereby, because the object range can be set adaptively according to the movement speed of the user, the object range determining unit 250 can set the object range to include peripheral information of the spot matched with the intention of the user.

The peripheral information acquiring unit 260 acquires the peripheral information on the map to be displayed on the screen of the display unit 120. For example, the peripheral information acquiring unit 260 acquires data regarding the peripheral information from an external apparatus (server), through the communication unit 130. The peripheral information acquiring unit 260 outputs the acquired peripheral information to the peripheral information selecting unit 270.

The peripheral information selecting unit 270 selects the selection object from the object range set by the object range determining unit 250. The peripheral information selecting unit 270 can select a selection object that corresponds to a type of the motion of the user. For example, the peripheral information selecting unit 270 selects the selection object from the object range, to confine the peripheral information matched with a category of the motion of the user. The peripheral information selecting unit 270 outputs the confined peripheral information to the peripheral information providing unit 280.

The peripheral information providing unit 280 provides the selection object according to the intention of the user among the selection objects displayed on the display unit 120 to the screen, on the basis of the selection information input from the peripheral information selecting unit 270. When the user is moving, the peripheral information providing unit 280 automatically updates the object range and switches the display.

4. EMBODIMENTS OF SETTING OF OBJECT RANGE

Next, specific examples of setting of the object range by the object range determining unit 250 will be described using the following embodiments.

First Embodiment

A first embodiment of setting of the object range will be described with reference to FIG. 6. FIG. 6 is a schematic diagram illustrating the first embodiment of setting of the object range.

In the first embodiment, the width of the object range is different according to the motion of the user (i.e., a type of user-related action). Another type of user-related action is interpretation of information (such as text based messaging sent over wired or wireless networks) contained in messages sent via the communication unit 130 (FIG. 1). In particular, the content of such messages may indicate the mode of transportation being employed by the user, and that indication is detected by the control unit 160 (an aspect of which is later described as an action recognition processing unit), and used to determine the user-related action. Similarly, a recent use of a transportation-related app (e.g. a smart phone app), such as a payment at a retail store, or at a train turnstile could be used to indicate the type of user-related action. should be noted that the As illustrated in FIG. 6, when the motion recognition processing unit 240 recognizes that the user is walking, the object range determining unit 250 sets an object range 310 of a shape of a circle having a specific radius R1. Meanwhile, when the motion recognition processing unit 240 recognizes that the user is running, the object range determining unit 250 sets an object range 320 of a shape of a circle having a specific radius R2 (which is larger than the radius R1). The object range determining unit 250 sets the radiuses R1 and R2 in consideration of the movable distance of the user. That is, if the movement speed of the user is fast, the radius of the object range is set large.

When the user is walking or running, the user can move in all directions. Therefore, the object range determining unit 250 sets a shape of the object range to a shape of a circle that spreads equally from the center. In this case, the center corresponds to the current position P of the user. For this reason, the object range mismatched with the motion of the user can be prevented from being set.

According to the first embodiment described above, the object range suitable for the motion is set by changing the width of the object range according to the motion of the user and the user can perceive the peripheral information suitable for the motion.

In the above description, the area of the object range has the circular shape. However, the present disclosure is not limited thereto. The object range determining unit 250 can set the shape of the area of the object range to various shapes, according to the motion of the user.

FIG. 7 is a schematic diagram illustrating a modification of the first embodiment. In the modification, object ranges 330 and 340 that have an elliptical shape are set. When the movement direction and the movement speed of the user can be recognized, the object range determining unit 250 sets the elliptical object ranges 330 and 340. That is, when the movement direction and the movement speed (movement vector V) of the user can be known, the object range determining unit 250 adjusts the center, the major axis, the minor axis, and the inclination of an ellipse, according to the movement vector V. The current position P of the user is a position apart from the center of the ellipse, different from FIG. 6.

Figure 8:
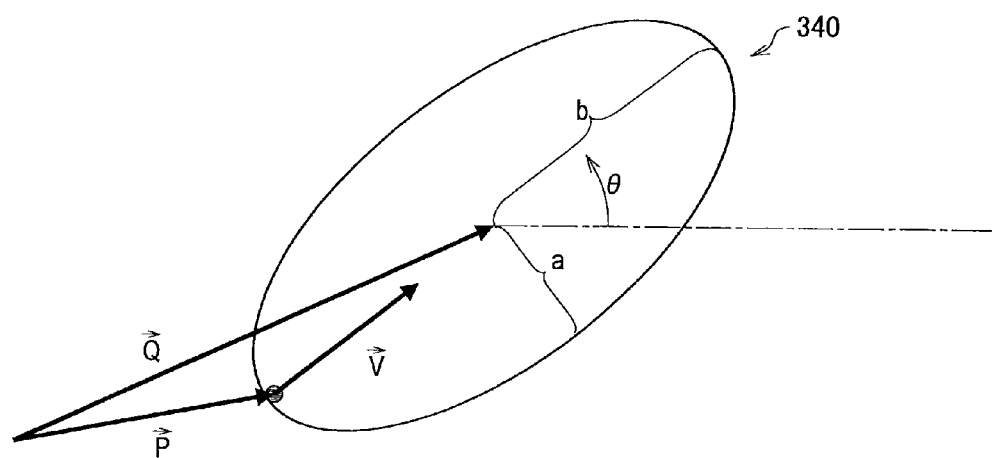
FIG. 8 is a schematic diagram illustrating a method of adjusting an elliptical object range according to a modification.

A method of adjusting the elliptical object range 340 according to the modification will be described with reference to FIG. 8. FIG. 8 is a schematic diagram illustrating a method of adjusting an elliptical object range according to the modification. The elliptical object range illustrated in FIG. 8 is determined by the following expressions (1) to (5).

$$\vec{Q} = \vec{P} + k\vec{V} \quad (k: \text{any constant}) \qquad \text{Expression (1)}$$

$$a = c_1 |\vec{V}| \quad (c_1: \text{any constant}) \qquad \text{Expression (2)}$$

$$b = c_2 |\vec{V}| \quad (c_2: \text{any constant}) \qquad \text{Expression (3)}$$

$$k|\vec{V}| < b \qquad \text{Expression (4)}$$

$$\theta = \tan^{-1}(V_y/V_x) \quad (V_x, V_y: X \text{ and } Y \text{ components of } \vec{V}) \quad \text{Expression (5)}$$

In this case, a shows a minor axis of an ellipse, b shows a major axis of the ellipse, and θ shows inclination. In addition, a vector P shows a current position of the user and the vector Q shows the center of an object range.

Thereby, the object range that includes the current position and is matched with the movement direction or the movement speed of the user can be calculated.

The object range determining unit 250 may adjust the width of the object range, according to the duration of one motion.

Figure 9:
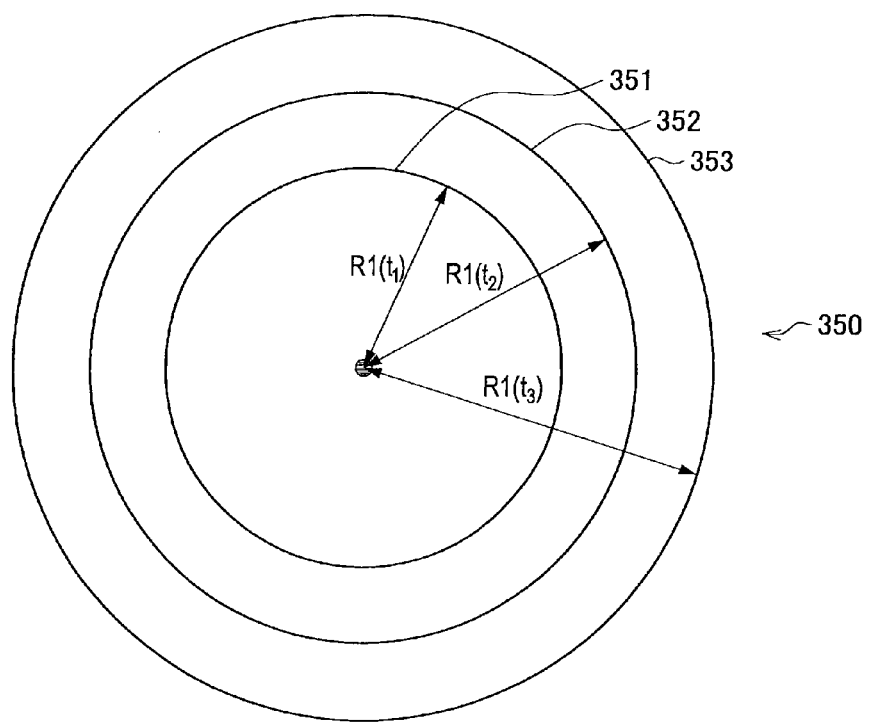
FIG. 9 is a schematic diagram illustrating adjustment of an object range according to the duration of motion according to the first embodiment.

FIG. 9 is a schematic diagram illustrating adjustment of an object range 350 according to the duration of motion according to the first embodiment. For example, when it is recognized that the user is walking, the object range determining unit 250 sets the object range to an object range 351 of a radius R1 (t1) until a time t1. Then, the object range determining unit 250 may set the object range to an object range 352 of a radius R1 (t2) from the time t1 to a time t2 and set the object range to an object range 353 of a radius R1 (t3) from the time 2 to a time t3. That is, when the duration of the motion is lengthened, the object range determining unit 250 widens the object range 350. The object ranges 351 to 353 change according to the current position of the user. However, in FIG. 9, the centers of the object ranges 351 to 353 are drawn at the same position to simplify the description.

As such, it is effective to adjust the object range according to the duration of the motion in the following points. That is, as compared with the case in which the object range is set widely by only the slight movement of the user, peripheral information regarding remote regions can be prevented from being selected, because the object range is not widened until a constant time passes, even though the user moves. As a result, excessive information can be prevented from being provided to the user.

Second Embodiment

Figure 10:
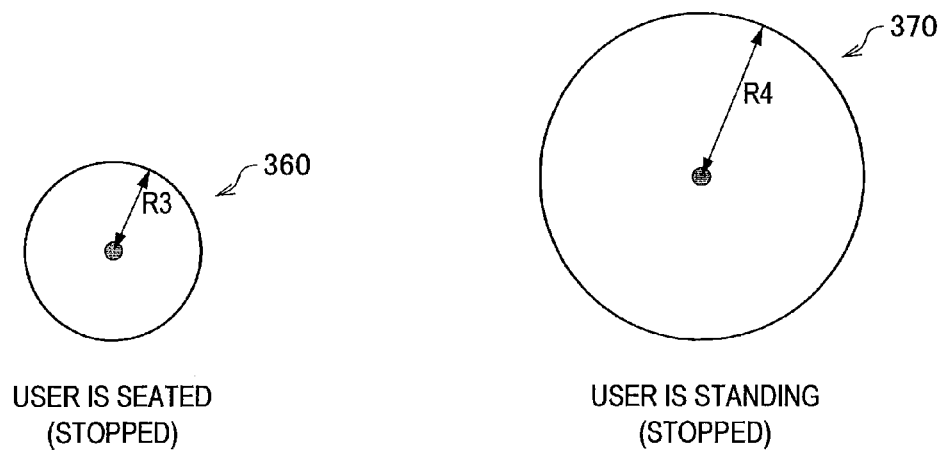
FIG. 10 is a schematic diagram illustrating a second embodiment of setting of an object range.

A second embodiment of setting of the object range will be described with reference to FIG. 10. FIG. 10 is a schematic diagram illustrating the second embodiment of setting of the object range.

Even in the second embodiment, the width of the object range is different according to the motion of the user. Although the object range set when the user moves has been described in the first embodiment, an object range set when the user is stopped will be described in the second embodiment. As illustrated in FIG. 10, when the motion recognition processing unit 240 recognizes that the user is seated, the object range determining unit 250 sets an object range of a shape of a circle having a specific radius R3. Meanwhile, when the motion recognition processing unit 240 recognizes that the user is standing, the object range determining unit 250 sets an object range of a shape of a circle having a specific radius R4.

As such, the reason why the object range of the specific radius is set even though the user is stopped in the second embodiment is that the user who is stopped may move somewhere thereafter. Because the possibility of the user moving when the user is standing is higher than the possibility of the user moving when the user is seated, the radius R3 is set to be smaller than the radius R4 (which is smaller than the radius R1 illustrated in FIG. 6). When the user is seated or is standing, the user may move in all directions. Therefore, the shape of the object range is set to a shape of a circle that spreads equally from the center.

In the second embodiment described above, the object range suitable for the motion is set by changing the width of the object range according to the motion of the user and the user can perceive the peripheral information suitable for the motion.

However, even in the second embodiment, the object range determining unit 250 may adjust the width of the object range, according to the duration of one motion.

Figure 11:
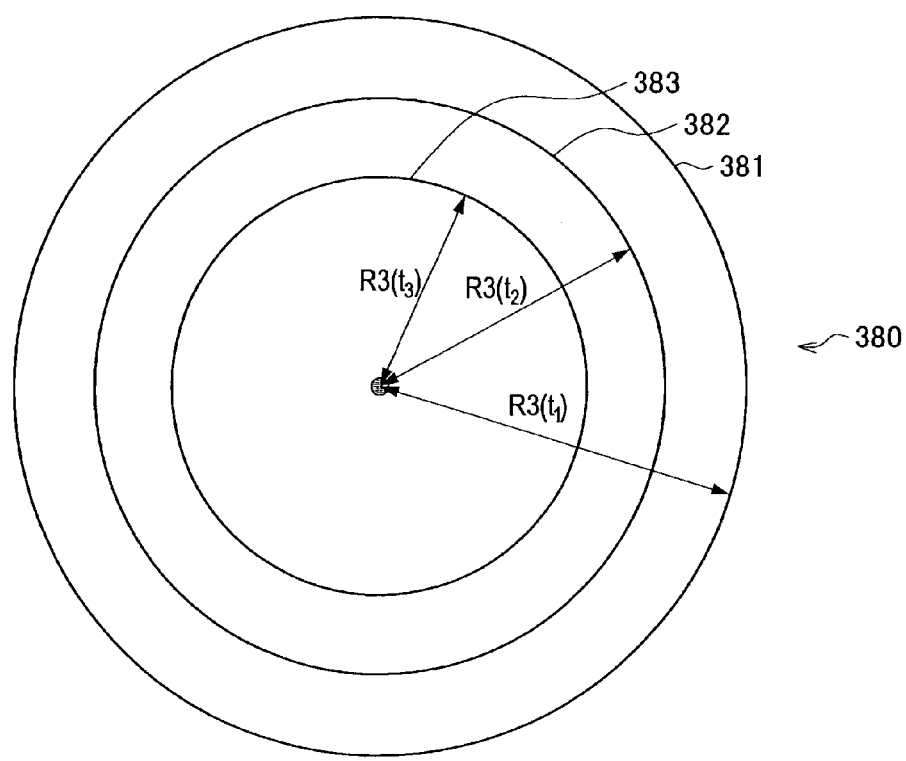
FIG. 11 is a schematic diagram illustrating adjustment of an object range according to the duration of motion according to the second embodiment.

FIG. 11 is a schematic diagram illustrating adjustment of an object range 380 according to the duration of one motion according to the second embodiment. In the first embodiment, the object range determining unit 250 widens the object range when the duration of the motion is lengthened. However, in the second embodiment, the object range determining unit 250 narrows the object range when the duration of the motion is lengthened.

That is, as illustrated in FIG. 11, when it is recognized that the user is seated, the object range determining unit 250 sets the object range to an object range 381 of a radius R1 (t1) until a time t1. Then, the object range determining unit 250 may set the object range to an object range 382 of a radius R3 (t2) from the time t1 to a time t2 and set the object range to an object range 383 of a radius R3 (t3) from the time t2 to a time t3.

As such, the object range is narrowed when the duration of the motion is lengthened and the peripheral information is limited (or excluded) little by little when the user stops and does not move anywhere, such that information suitable for a state of the user can be provided.

Third Embodiment

Figure 12:
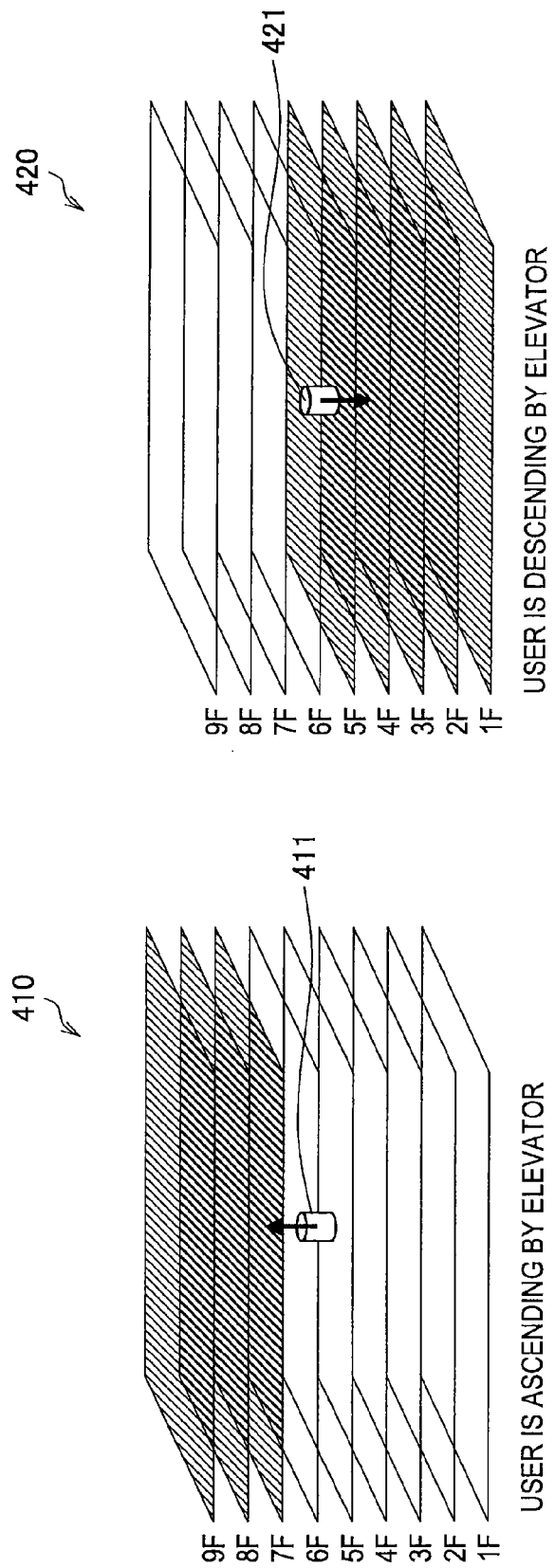
FIG. 12 is a schematic diagram illustrating a third embodiment of setting of an object range.

A third embodiment of setting of the object range will be described with reference to FIG. 12. FIG. 12 is a schematic diagram illustrating the third embodiment of setting of the object range.

In the third embodiment, setting of the object range in a case where the user gets on an elevator, which is an example of an elevating object, and ascends and descends in a structure will be described. In this case, it is assumed that the structure has nine floors from a first floor (1F) to a ninth floor (9F).

When the motion recognition processing unit 240 recognizes that the user is on the elevator and is ascending in the structure (ascending state), the object range determining unit 250 sets all of floors higher than a floor where the elevator is positioned as an object range 410. For example, as shown in FIG. 12, when an elevator 411 stops at 6F, the object range determining unit 250 sets all of floors of 7F to 9F as the object range 410.

Meanwhile, when the motion recognition processing unit 240 recognizes that the user is on the elevator and is descending in the structure (descending state), the object range determining unit 250 sets all of floors lower than a floor where the elevator is positioned as an object range 420. For example, as shown in FIG. 12, when an elevator 421 stops at 6F, the object range determining unit 250 sets all of floors of 1F to 5F as the object range 420.

The object range determining unit 250 can update the object range, according to the position of the moving elevator. Thereby, the user can perceive peripheral information suitable for the position of the elevator in real time.

According to the third embodiment described above, because the peripheral information of the floors corresponding to an ascending/descending direction of the elevating object the user is in in the structure is provided to the user, the peripheral information of the floors in the direction opposite to the movement direction of the user can be prevented from being provided. As a result, peripheral information according to the intention of the user can be provided. In the above description, the elevator is used as the elevating object. However, even when the elevating object is an escalator, the same effect can be achieved.

Fourth Embodiment

Figure 13:
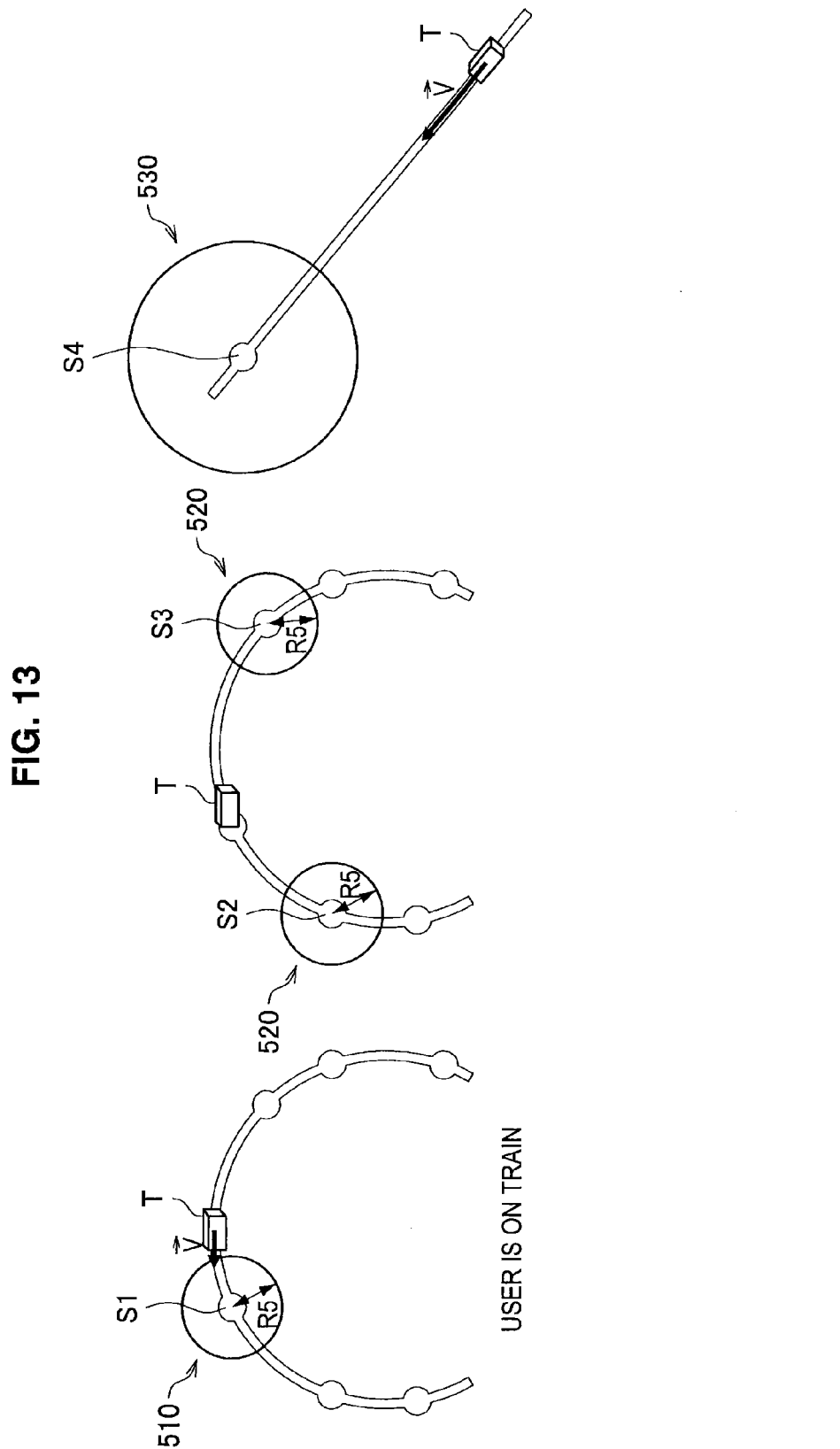
FIG. 13 is a schematic diagram illustrating a fourth embodiment of setting of an object range.

A fourth embodiment of setting of the object range will be described with reference to FIG. 13. FIG. 13 is a schematic diagram illustrating the fourth embodiment of setting of the object range.

In the fourth embodiment, setting of the object range in a case where the user gets on a train and moves will be described. For example, when the motion recognition processing unit 240 recognizes that the user is on a train T and is moving, the object range determining unit 250 sets an object range 510 of a shape of a circle of a radius R5 around a next stop S1 in a route, as illustrated at a left side of FIG. 13. Thereby, the user can perceive peripheral information of the stop S1 in advance.

The example of the case in which the movement direction of the train T can be specified has been described. However, when the movement direction of the train T may not be specified, the object range determining unit 250 may set an object range 520 of a shape of a circle of a radius R5 around stops S2 and S3 of both sides adjacent to the next stop S1, as illustrated at a middle side of FIG. 13.

However, when the speed is fast constantly, the train is more likely to be a Shinkansen bullet train, a limited express train, or an express train, a station where the train stops may be positioned at a relatively big city, and a range of peripheral information which the user desires to obtain may be widened. Therefore, in this case, the object range determining unit 250 may greatly set a radius of an object range 530 based on a next stop S4, as illustrated at a right side of FIG. 13. Thereby, the user can perceive entire peripheral information of a region where the station S4 is positioned.

The setting of the object range according to the fourth embodiment described above is effective when it can be known that the train T the user is on stops at a specific stop and the user can appropriately perceive peripheral information of a stop.

The train has been described as the example. However, the present disclosure is not limited thereto. Any vehicle that stops at a specific place may be applied. For example, as illustrated in FIG. 14, even when it is recognized that the user is on a bus, the object range can be set in the same manner as the case described above.

Figure 14:
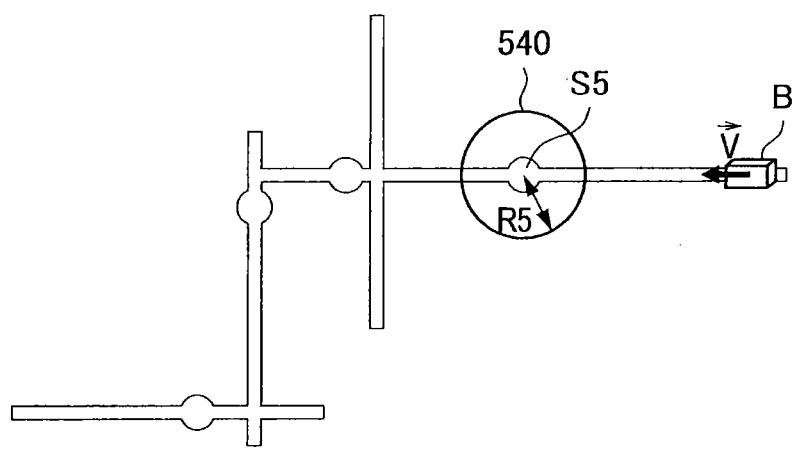
FIG. 14 is a schematic diagram illustrating a modification of the fourth embodiment.

FIG. 14 is a schematic diagram illustrating a modification of the fourth embodiment. Specifically, FIG. 14 illustrates the case in which the user is on a bus. When the motion recognition processing unit 240 recognizes that the user is on a bus B and is moving, the object range determining unit 250 sets an object range 540 of a shape of a circle of a radius R5 around a next stop S5 in a route, as illustrated in FIG. 14. When the user is on an express bus of which the speed is fast constantly, the object range determining unit 250 may increase the radius of the object range.

Fifth Embodiment

A fifth embodiment of setting of the object range will be described with reference to FIG. 15. FIG. 15 is a schematic diagram illustrating the fifth embodiment of setting of the object range.

In the fifth embodiment, setting of the object range when the user gets on a car will be described. For example, when the motion recognition processing unit 240 recognizes that the user is on a car C and is moving, the object range determining unit 250 sets an object range 550 having a long rectangular shape toward the front side of a movement direction of the car C, as illustrated at the left side of FIG. 15.

In this case, a method of setting the object range 550 is the same as the method of setting the object range 430 in FIG. 8 described above. However, because the car may not stop suddenly, the car may not satisfy the condition of the expression (4) described above.

The rectangular object range has been set. However, when the movement direction of the car may not be specified, the object range determining unit 250 may set a square object range. As illustrated at the right side of FIG. 15, a rectangular object range 560 based on a main intersection may be set. Because the car is more likely to be on an expressway when the speed of the car is fast, a rectangular object range based on a main interchange or parking area may be set.

The setting of the object range according to the fifth embodiment described above is effective when it can be known that the car the user is on moves in only the specific place and the user can appropriately perceive peripheral information of a specific spot.

The car has been described as the example. However, the present disclosure is not limited thereto. For example, as illustrated in FIG. 16, even when it is recognized that the user is on a bicycle, the object range can be set in the same manner as the case described above.

Figure 16:
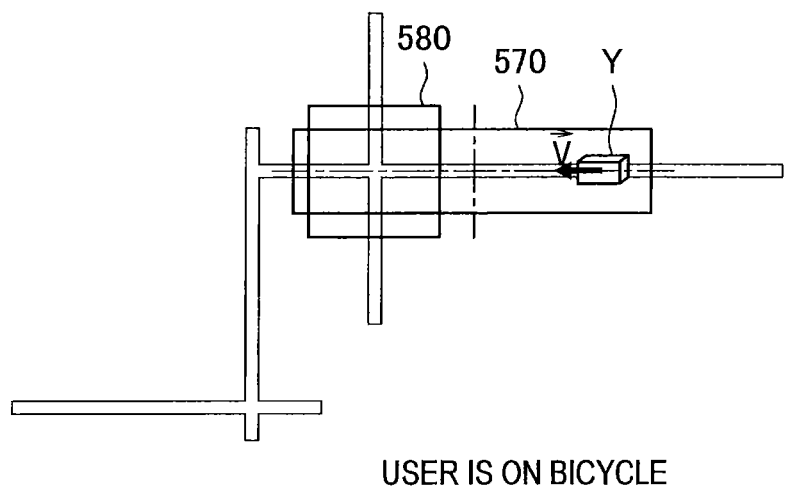
FIG. 16 is a schematic diagram illustrating a modification of the fifth embodiment.

FIG. 16 is a schematic diagram illustrating a modification of the fifth embodiment. Specifically, FIG. 16 illustrates the case in which the user is on the bicycle. When the motion recognition processing unit 240 recognizes that the user is on a bicycle Y and is moving, the object range determining unit 250 sets an object range 570 having a long rectangular shape toward the front side of a movement direction of the bicycle Y, as illustrated in FIG. 16. The object range determining unit 250 may add a rectangular object range based on an intersection at the front side of the movement direction.

Confinement of Selection Object in Object Range According to Type of Motion

The setting of the object range when the motion recognition processing unit 240 recognizes that the user is moving or is stopped as the motion recognition (such motion recognition is called low-level motion recognition to simplify the description) has been described. Hereinafter, confinement of a selection object in an object range that is set by performing high-level motion recognition by the motion recognition processing unit 240 will be described.

Figure 17:
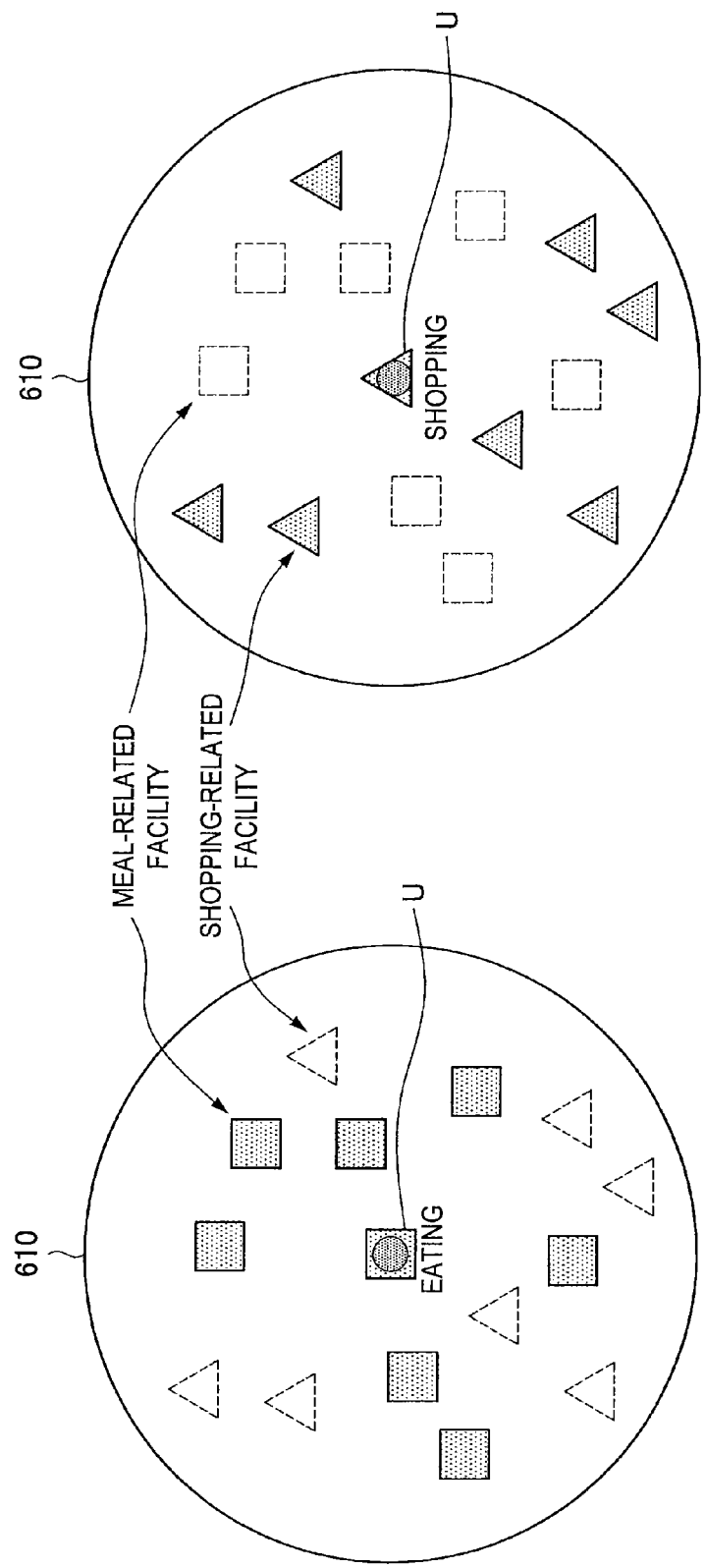
FIG. 17 is a schematic diagram illustrating confinement of a selection object in an object range according to a type of motion.

FIG. 17 is a schematic diagram illustrating confinement of a selection object in an object range according to a type of motion. In this case, it is assumed that an object range 610 is set by the low-level motion recognition. In addition, it is assumed that the object range 610 includes meal-related facilities (shown by □) and shopping-related facilities (shown by △).

For example, when it is recognized that the user is eating by the high-level motion recognition by the motion recognition processing unit 240, the peripheral information selecting unit 270 selects the meal-related facilities in the object range 610 and emphasizes and displays the meal-related facilities, as illustrated at a left side of FIG. 17. Instead of emphasizing and displaying the meal-related facilities, only the meal-relate facilities may be displayed without displaying the other facilities. Likewise, when it is recognized that the user is shopping, the peripheral information selecting unit 270 selects the shopping-related facilities in the object range 610 and emphasizes and displays the shopping-related facilities, as illustrated at a right side of FIG. 17.

As such, peripheral information in which the intention of the user is reflected can be provided by selecting only the peripheral information associated with the types of motions of the user in the object range. That is, because a large amount of peripheral information may be included in the object range set by the low-level motion recognition, excessive information can be prevented from being provided to the user, by confining the peripheral information by the high-level motion recognition.

5. OPERATION OF INFORMATION PROCESSING APPARATUS

An operation of the information processing apparatus 100 when an object range is set and a selection object is confined will be described with reference to FIG. 18.

Figure 18:
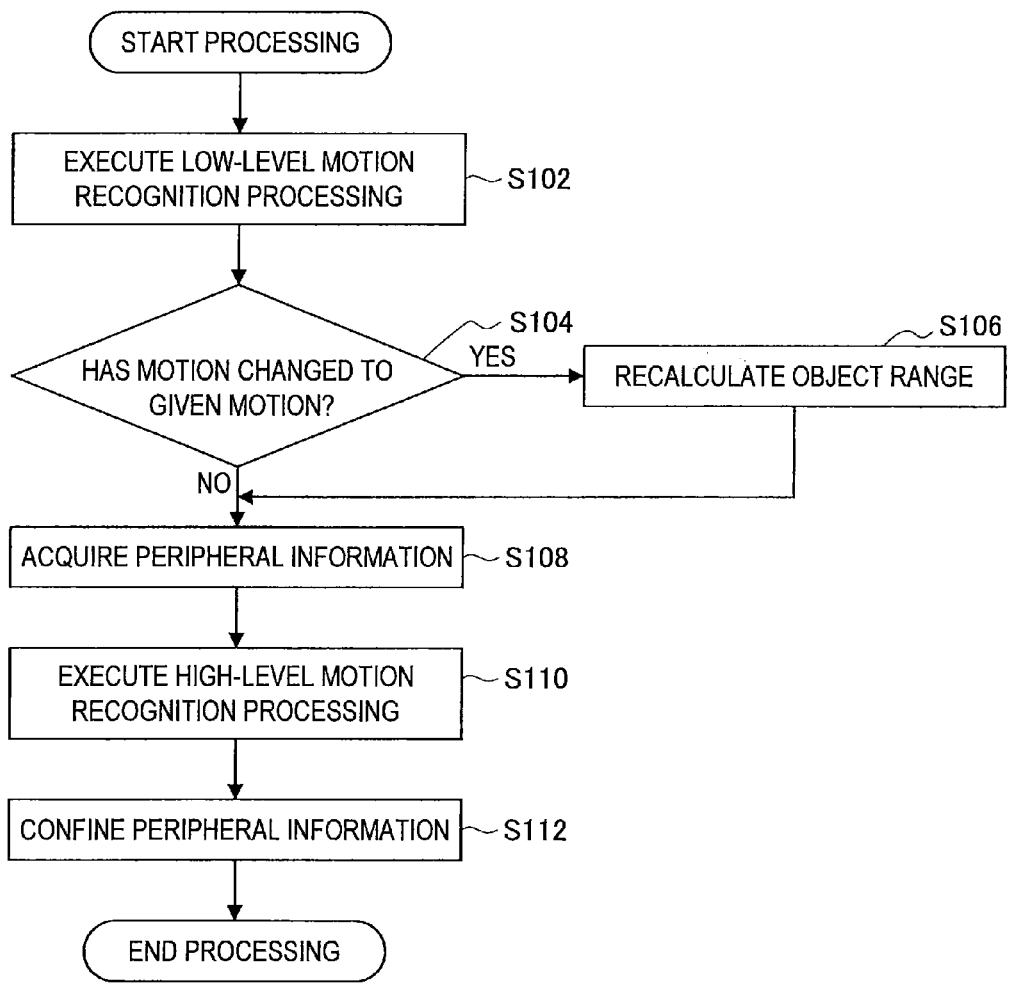
FIG. 18 is a flowchart illustrating an operation of an information processing apparatus when a selection object is confined by setting an object range.

FIG. 18 is a flowchart illustrating the operation of the information processing apparatus 100 when the object range is set and the selection object is confined. This flowchart starts when the user displays a map on the display unit 120.

This processing is realized by executing a program stored in a ROM by a CPU of the control unit 160. The executed program may be stored in recording media such as a compact disk (CD), a digital versatile disk (DVD), and a memory card and may be downloaded from a server through the Internet.

First, the motion recognition processing unit 240 executes low-level motion recognition processing (step S102). For example, the motion recognition processing unit 240 recognizes whether the user is moving or is stopped, on the basis of the position data input from the position data acquiring unit 210 and the operation data input from the operation data acquiring unit 220.

Next, the motion recognition processing unit 240 determines whether the motion has changed to the given motion (step S104). When it is determined in step S240 that the motion has changed to the given motion (Yes), the object range determining unit 250 recalculates an object range (step S106). That is, the object range determining unit 250 changes the magnitude of a radius of the object range.

Next, the peripheral information acquiring unit 260 acquires peripheral information (step S108). The peripheral information acquiring unit 260 acquires data regarding the peripheral information from an external apparatus (server), through the communication unit 130.

When it is determined in step S104 that the motion has not changed to the given motion (No), the object range determining unit 250 maintains the previously set object range. Then, processing of step S108 is executed.

After the processing of step S108, the motion recognition processing unit 240 executes high-level motion recognition processing (step S110). For example, the motion recognition processing unit 240 recognizes the detailed motion of the user such as whether the user is eating or shopping.

Next, the peripheral information selecting unit 270 confines the peripheral information (step S112). The peripheral information selecting unit 270 selects the peripheral information corresponding to the motion identified by the high-level motion recognition processing, from the set object range. For example, when the user is shopping, the peripheral information selecting unit 270 selects the shopping-related facilities from the object range.

The peripheral information providing unit 280 displays the peripheral information confined by the peripheral information selecting unit 270 on the map displayed on the screen. Thereby, the user can separately perceive the peripheral information in which the motion of the user is reflected in the object range.

6. CONCLUSION

As described above, the information processing apparatus 100 acquires the motion information of the user and acquires the current position information. In addition, the information processing apparatus 100 sets the object range for selecting the selection object on the map, according to the acquired motion information and the acquired current position information.

According to this configuration, the object range is automatically set on the basis of the motion information and the current position information of the user. For this reason, even though the user does not perform the operation for setting the selection range, a useful selection range that corresponds to a context (information such as the position information and the motion information in which the intention of the user is reflected) in which the user is put is set.

It should be understood by those skilled in the art that various modifications, combinations, sub-combinations and alterations may occur depending on design requirements and other factors insofar as they are within the scope of the appended claims or the equivalents thereof.

The steps illustrated in the flowchart according to the embodiments may include processing executed temporally according to the order described and processing executed in parallel or individually. In the steps that are processed temporally, the order may be appropriately changed in some cases.

Additionally, the following configurations are also within the technical scope of the present disclosure.

In an information processing apparatus embodiment, the apparatus includes a control unit that determines content to be displayed within an object range on a map; and an action recognition processing unit that detects a user-related action, wherein said control unit determines the content to be displayed within the object range, said object range including a current position of the information processing apparatus and a coverage area of said object range being based on the user-related action detected by the action recognition processing unit.

According to another aspect of the embodiment, the control unit changes the coverage area of the object range according to a motion associated with the user-related action.

According to another aspect of the embodiment, the apparatus further includes the control unit sets a non-circular shape of the coverage area of the object range according to the motion associated with the user-related action.

According to another aspect of the embodiment, an orientation of the non-circular shape is based on the motion associated with the user-related action.

According to another aspect of the embodiment, a shape of the coverage area is changed based on a velocity of the user related action.

According to another aspect of the embodiment, the control unit sets the object range such that a newly acquired position is displayed at an edge of the object range.

According to another aspect of the embodiment, the control unit sets the object range such that a position of a motion destination of a user becomes a center of the object range.

According to another aspect of the embodiment, the apparatus further includes a movement information acquiring unit that acquires information regarding a movement speed of motion of a user, wherein the control unit sets the coverage area of the object range more widely when the movement speed increases and sets the coverage area of the object range more narrowly when the movement speed decreases.

According to another aspect of the embodiment, the non-circular shape is elliptical and the object range is not centered in the non-circular shape.

According to another aspect of the embodiment, the control unit changes the shape of the object area according to a duration of the user-related action detected by the action recognition processing unit.

According to another aspect of the embodiment, the control unit sets the coverage area of the object range narrowly, when the duration is lengthened.

According to another aspect of the embodiment, the control unit changes the coverage area of the object range more widely, when the duration is lengthened.

According to another aspect of the embodiment, the control unit changes the object area in response to the action recognition processing unit detecting a change in the user-related action.

According to another aspect of the embodiment, the action recognition processing unit detects the user-related action via a communications message.

According to another aspect of the embodiment, the action recognition processing unit detects the user-related action via execution of an app.

According to another aspect of the embodiment, the apparatus further includes a peripheral information selecting unit that selects a selection object to be displayed in said object area.

According to another aspect of the embodiment, the peripheral information selecting unit selects the selection object based on the user-related action detected by an action recognition processing unit.

According to another aspect of the embodiment, the peripheral information selecting unit changes to a different selection object to be displayed when the action recognition processing unit detects a change in the user-related action.

According to an information processing method embodiment, the method includes determining with a control unit content to be displayed within an object range on a map; and detecting a user-related action associated with an information processing device, wherein said determining includes determining the content to be displayed within the object range, said object range including a current position of the information processing apparatus and a coverage area of said object range being based on the user-related action detected by the detecting.

According to a non-transitory computer readable storage medium embodiment, the storage medium has computer readable instructions stored therein that when executed by a processing circuit perform a method, the method includes determining with a control unit content to be displayed within an object range on a map; and detecting a user-related action associated with an information processing device, wherein said determining includes determining the content to be displayed within the object range, said object range including a current position of the information processing apparatus and a coverage area of said object range being based on the user-related action detected by the detecting.

The present disclosure contains subject matter related to that disclosed in Japanese Priority Patent Application JP 2011-223848 filed in the Japan Patent Office on Oct. 11, 2011, the entire content of which is hereby incorporated by reference.

What is claimed is:

1. An information processing apparatus comprising:
   circuitry configured to:
   determine content to be displayed within an object range on a map;
   detect a user-related action as a mode of transportation employed by a user or a physical action of the user based on interpretation of information communicated with the information processing apparatus; and
   determine whether the mode of transportation includes a transportation using a train that stops at specific train stations, wherein
   said circuitry determines the content to be displayed within the object range, said object range including a current position of the information processing apparatus and a coverage area of said object range being based on the user-related action detected by the circuitry,
   in a case that the circuitry determines the mode of transportation includes the transportation using the train that stops at the specific train stations, the circuitry sets geographic areas in which the object range is set that correspond with geographic areas that surround train stations and exclude geographic areas in between train stations and that do not surround the train stations,
   in the case that the circuitry determines the mode of transportation includes the transportation using the train that stops at the specific train stations, the circuitry determines a movement direction of the train and sets geographic areas in which the object range is set that correspond with geographic areas that surround a next train station based on the determined movement direction, and
   in the case that the circuitry determines the mode of transportation includes the transportation using the train that stops at the specific train stations, the circuitry determines that the train is at a first train station located between a second train station and a third train station each adjacent to the first train station respectively, the first train station being connected to the second train station and the third train station by train line, and the circuitry cannot determine the movement direction of the train, the circuitry sets geographic areas in which the object range is set that correspond with geographic areas that surround the second train station and the third train station.

2. The information processing apparatus of claim 1, wherein
   the circuitry changes the coverage area of the object range according to a motion associated with the user-related action.

3. The information processing apparatus of claim 1, wherein the circuitry sets a non-circular shape of the coverage area of the object range according to the motion associated with the user-related action.

4. The information processing apparatus of claim 3, wherein
an orientation of the non-circular shape is based on the motion associated with the user-related activity.

5. The information processing apparatus of claim 1, wherein
a shape of the coverage area is changed based on a velocity of the user related action.

6. The information processing apparatus of claim 1, wherein
the circuitry sets the object range such that a newly acquired position is displayed at an edge of the object range.

7. The information processing apparatus according to claim 1, wherein
the circuitry sets the object range such that a position of a motion destination of a user becomes a center of the object range.

8. The information processing apparatus of claim 2, wherein
the circuitry acquires information regarding a movement speed of motion of a user, and
the circuitry sets the coverage area of the object range more widely in a case that the movement speed increases and sets the coverage area of the object range more narrowly when the movement speed decreases.

9. The information processing apparatus of claim 3, wherein
the non-circular shape is elliptical and the object range is not centered in the non-circular shape.

10. The information processing apparatus of claim 2, wherein
the circuitry changes the shape of the object area according to a duration of the user-related action detected by the circuitry.

11. The information processing apparatus of claim 10, wherein
the circuitry sets the coverage area of the object range narrowly, when the duration is lengthened.

12. The information processing apparatus according to claim 10, wherein
the circuitry changes the coverage area of the object range more widely, when the duration is lengthened.

13. The information processing apparatus of claim 2, wherein
the circuitry changes the object area in response to the circuitry detecting a change in the user-related action.

14. The information processing apparatus of claim 1, wherein
the circuitry detects the user-related action via a communications message.

15. The information processing apparatus of claim 1, wherein
the circuitry detects the user-related action via execution of an app.

16. The information processing apparatus of claim 1, wherein the circuitry selects a selection object to be displayed in said object area.

17. The information processing apparatus of claim 16, wherein
the circuitry selects the selection object based on the user-related action detected by the circuitry.

18. The information processing apparatus of claim 17, wherein
the circuitry changes to a different selection object to be displayed in a case that the circuitry detects a change in the user-related action.

19. The information processing apparatus of claim 1, wherein
in a case that the circuitry determines a speed of the train is higher than a predetermined threshold, the circuitry sets the geographic areas in which the object range is set with larger area than the area in a case that the circuitry determines the speed of the train is less than or equal to the predetermined threshold.

20. An information processing method comprising:
determining, using circuitry, content to be displayed within an object range on a map;
detecting a user-related action associated with an information processing device, the user-related action being detected as a mode of transportation used by the user or a physical action of the user based on interpretation of information communicated with the information processing apparatus; and
determining, using the circuitry, whether the mode of transportation includes a transportation using a train that stops at specific train stations, wherein
said determining of the content includes determining the content to be displayed within the object range, said object range including a current position of the information processing apparatus and a coverage area of said object range being based on the user-related action detected by the detecting, and
the method further comprising:
in a case that the circuitry determines the mode of transportation includes the transportation using the train that stops at the specific train stations, setting geographic areas in which the object range is set that correspond with geographic areas that surround train stations and exclude geographic areas in between train stations and that do not surround the train stations;
in the case that the circuitry determines the mode of transportation includes the transportation using the train that stops at the specific train stations, determining a movement direction of the train and setting geographic areas in which the object range is set that correspond with geoaraphic areas that surround a next train station based on the determined movement direction; and
in the case that the circuitry determines the mode of transportation includes the transportation using the train that stops at the specific train stations, determining that the train is at a first train station located between a second train station and a third train station each adjacent to the first train station respectively, the first train station being connected to the second train station and the third train station by train line, and the circuitry cannot determine the movement direction of the train, setting geographic areas in which the object range is set that correspond with geographic areas that surround the second train station and the third train station.

21. An non-transitory computer readable storage medium having computer readable instructions stored therein that when executed by circuitry perform a method, the method comprising:
determining content to be displayed within an object range on a map;
detecting a user-related action associated with an information processing device, the user-related action being detected as a mode of transportation used by the user or a physical action of the user based on interpretation of information communicated with the information processing apparatus; and determining whether the mode of transportation includes a transportation using a train that stops at specific train stations, wherein said determining of the content includes determining the content to be displayed within the object range, said object range including a current position of the information processing apparatus and a coverage area of said object range being based on the user-related action detected by the detecting, and the method further comprising:

in a case that the circuitry determines the mode of transportation includes the transportation using the train that stops at the specific train stations, setting geographic areas in which the object range is set correspond with geographic areas that surround train stations and exclude geographic areas in between train stations and that do not surround the train stations;

in the case that the circuitry determines the mode of transportation includes the transportation using the train that stops at the specific train stations, determining a movement direction of the train and setting geographic areas in which the object range is set that correspond with geographic areas that surround a next train station based on the determined movement direction; and in the case that the circuitry determines the mode of transportation includes the transportation using the train that stops at the specific train stations, determining that the train is at a first train station located between a second train station and a third train station each adjacent to the first train station respectively, the first train station being connected to the second train station and the third train station by train line, and the circuitry cannot determine the movement direction of the train, setting geographic areas in which the object range is set that correspond with geographic areas that surround the second train station and the third train station.

* * * * *